US006032024A

United States Patent [19]
Makino

[11] Patent Number: 6,032,024

[45] Date of Patent: Feb. 29, 2000

[54] CALL RECEIVER HAVING A DISPLAY FOR DISPLAYING PORTIONS OF A RECEIVED MESSAGE IN DIFFERENT COLORS

[75] Inventor: Tetsuya Makino, Shizuoka, Japan

[73] Assignee: NEC Corporation, Tokyo, Japan

[21] Appl. No.: 08/881,007

[22] Filed: Jun. 23, 1997

[30] Foreign Application Priority Data

Jun. 21, 1996 [JP] Japan .................................... 8-162126

[51] Int. Cl.[7] ........................................................ H04B 7/00

[52] U.S. Cl. ................... 455/38.4; 455/38.1; 340/825.44

[58] Field of Search ................................. 455/38.1, 38.2, 455/38.3, 38.4; 340/825.44

[56] References Cited

U.S. PATENT DOCUMENTS 4,975,694 12/1990 McLaughlin ........................ 340/825.44
5,005,013 4/1991 Tsukamoto et al. ............... 340/825.44

FOREIGN PATENT DOCUMENTS 5-252094 9/1993 Japan .
7-50628 2/1995 Japan .
7-202774 8/1995 Japan .
8-8797 1/1996 Japan .
WO90/10998A1 9/1990 WIPO .

*Primary Examiner*—Reinhard J. Eisenzopf
*Assistant Examiner*—Darnell R. Armstrong
*Attorney, Agent, or Firm*—Sughrue, Mion, Zinn, Macpeak & Seas, PLLC

[57] ABSTRACT

A selective call receiver includes a memory storing a plurality of predetermined data pieces which correspond to different displaying colors, respectively. After checking whether a received message includes one of the predetermined data pieces, message characters following a predetermined data piece included in the received message is displayed in a displaying color corresponding to the predetermined data piece.

16 Claims, 5 Drawing Sheets

FIG. 2

SPECIFIC DATA MEMORY

| SPECIFIC DATA SD | DESIGNATED COLOR CD |
|---|---|
| $SD_1$ ( [ 1 ) | $CD_1$ ( BLACK ) |
| $SD_2$ ( [ 2 ) | $CD_2$ ( WHITE ) |
| $SD_3$ ( [ 3 ) | $CD_3$ ( RED ) |
| $SD_4$ ( [ 4 ) | $CD_4$ ( BLUE ) |
| ⋮ | ⋮ |
| $SD_N$ ( [ N ) | $CD_N$ |

CALL RECEIVER HAVING A DISPLAY FOR DISPLAYING PORTIONS OF A RECEIVED MESSAGE IN DIFFERENT COLORS

BACKGROUND OF THE INVENTION

1. Field of the invention

The present invention generally relates to a selective calling system, and in particular to a selective call receiver which is provided with a display for displaying a received message.

2. Description of the Related Art

A selective call receiver has been widely used for various purposes and, especially, a small-sized and lightweight selective call receiver called a pager is suitable for being taken on the road. One of basic functions of the selective call receiver is to indicate by beep sound, vibration, or light the incoming call and then to display a received message on an liquid-crystal display (LCD) according to the user's key operation.

In general, the received message is displayed on screen with a matrix of dots for each character. For example, 4 lines of 22 alphanumeric characters may be displayed on screen with 5×7 dots for each character, and 2 lines of 8 kanji characters may be displayed on screen with 16×16 dots for each character. As the screen size of the LCD becomes larger, an increasing number of characters can be displayed at a time, and further the increasing amount of data can be transmitted.

In conventional receivers as described above, however, the received message is displayed on screen in monotone. Therefore, it is very difficult to put emphasis on a desired area of the received message. Seeing the received message on screen in monotone, the user of the receiver cannot recognize that area as highlighted words.

SUMMARY OF THE INVENTION

An object of the present invention is to provide a method and apparatus which display received message in easy-to-understand image on screen.

According to the present invention, in a selective call receiver, a plurality of predetermined data pieces are stored which correspond to different displaying colors, respectively. After checking whether received message data comprising a plurality of data pieces includes one of the predetermined data pieces, message data following a predetermined data piece included in the received message data is displayed in a displaying color corresponding to the predetermined data piece. Preferably, the predetermined data pieces are stored in a rewritable memory.

Therefore, an information piece on which emphasis is to be put can be displayed in a desired color on the receiver's display, which causes a receiver user to recognize it as important information at a glance.

BRIEF DESCRIPTION OF THE DRAWINGS

FIG. 2 is a schematic diagram showing an example of the contents of a specific data memory provided in the embodiment of FIG. 1;

DETAILED DESCRIPTION OF THE PREFERRED EMBODIMENTS

Figure 1:
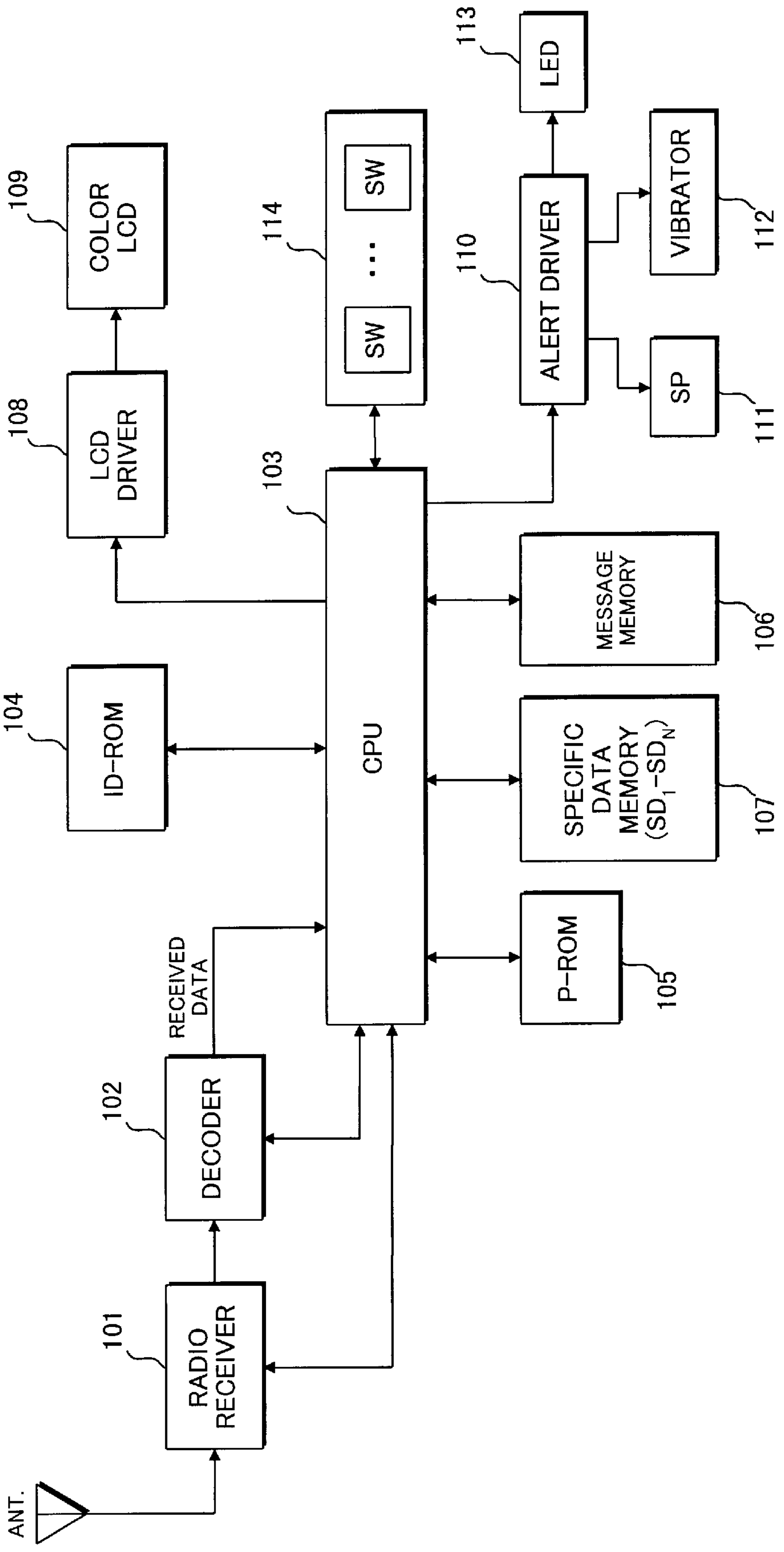
FIG. 1 is a block diagram showing the functional arrangement of an embodiment of a radio selective calling receiver according the present invention.

Referring to FIG. 1, a radio selective calling receiver is comprised of a radio system module, a control unit, and other components. The radio system module is comprised of a built-in antenna and a radio receiver 101 including a waveform-shaped circuit. The radio receiver 101 receives a digital-modulated (here, FSK) radio signal from a radio base station (not shown) of a selective calling system through the built-in antenna. The radio receiver 101 further includes a digital demodulator which demodulates the received radio signal into a baseband signal. After the waveform of the baseband signal is shaped by the waveform shaping circuit, the wave-shaped signal is transferred as a selective call signal from the radio receiver 101 to a decoder 102 of the control unit.

The decoder 102 receives the selective call signal from the radio receiver 101 and decodes it into received data. A control processor 103 compares the selective calling number included in the received data with the identification (ID) number previously stored in an ID-ROM 104 which may be an EEPROM (electrically-erasable programmable read-only memory). The control processor 103 uses an operating program and other function programs stored in a program ROM 105 to perform the operation control of the selective call receiver. The program ROM 105 further stores a set of characters or a font for displaying messages on screen.

When the selective calling number included in the received data is identical to the ID number, the control processor 103 outputs message data MD included in the received data to a message memory 106 which may be a random access memory (RAM).

The control unit is further comprised of a specific data memory 107 which stores a plurality of pieces of specific data $SD_1$–$SD_N$ which are previously assigned to different colors, respectively. Each of the specific data pieces $SD_1$–$SD_N$ may be a string of predetermined characters or symbols or a combination of predetermined character and symbol. Since the specific data pieces $SD_1$–$SD_N$ are predetermined, they may be stored in the ID-ROM 104 or the program ROM 105. In the case where the specific data $SD_1$–$SD_N$ are stored in a rewritable memory such as the ID-ROM 104, the specific data $SD_1$–$SD_N$ can be rewritten from outside, resulting in improved convenience. The control processor 103 performs a message displaying control using a message character font in accordance with the received message together with the corresponding color data. The controls processor 103 control a LCD driver 108 according to the message character font and the corresponding color data, which causes a color LCD device 109 to display the received message with selected colors on screen. Such a message displaying control will be described in detail later.

When the selective calling number included in the received data is identical to the ID number as described before, the control processor 103 controls an alert driver 110 such that a speaker 111 makes a beep, a vibrator 112 generates vibration, or an LED (light-emitting diode) 113 blinks for notifying the user of the incoming call. When the user is aware of an incoming call through the speaker 111, the vibrator 112 or the LED 113, the user manually operates a keypad 114 to stop the informer, such as the speaker 111, from working. By the user pressing a function key of the keypad 114 to read a received message, the received message is displayed with selected colors on screen.

As Illustrated in FIG. 2, in this embodiment, the specific data memory 107 stores N specific data pieces $SD_1$–$SD_N$ which correspond to N different displaying colors, respectively. For example, a specific data piece $SD_1$ corresponds to color data $CD_1$ indicating a black color, a specific data piece $SD_2$ corresponds to color data $CD_2$ indicating a white color, a specific data piece $SD_3$ corresponds to color data $CD_3$ indicating a red color, and so on. In this example, the specific data SD consists of two characters where the first character is "[" and the second character is a numeral. The control processor 103 sequentially reads a character from the received message and compares it with each of the specific data pieces $SD_1$–$SD_N$. When the read character is identical to one of the specific data pieces $SD_1$–$SD_N$, the message characters following that specific data piece are displayed in the corresponding color of the specific data piece. The details will be described hereinafter.

Figure 3:
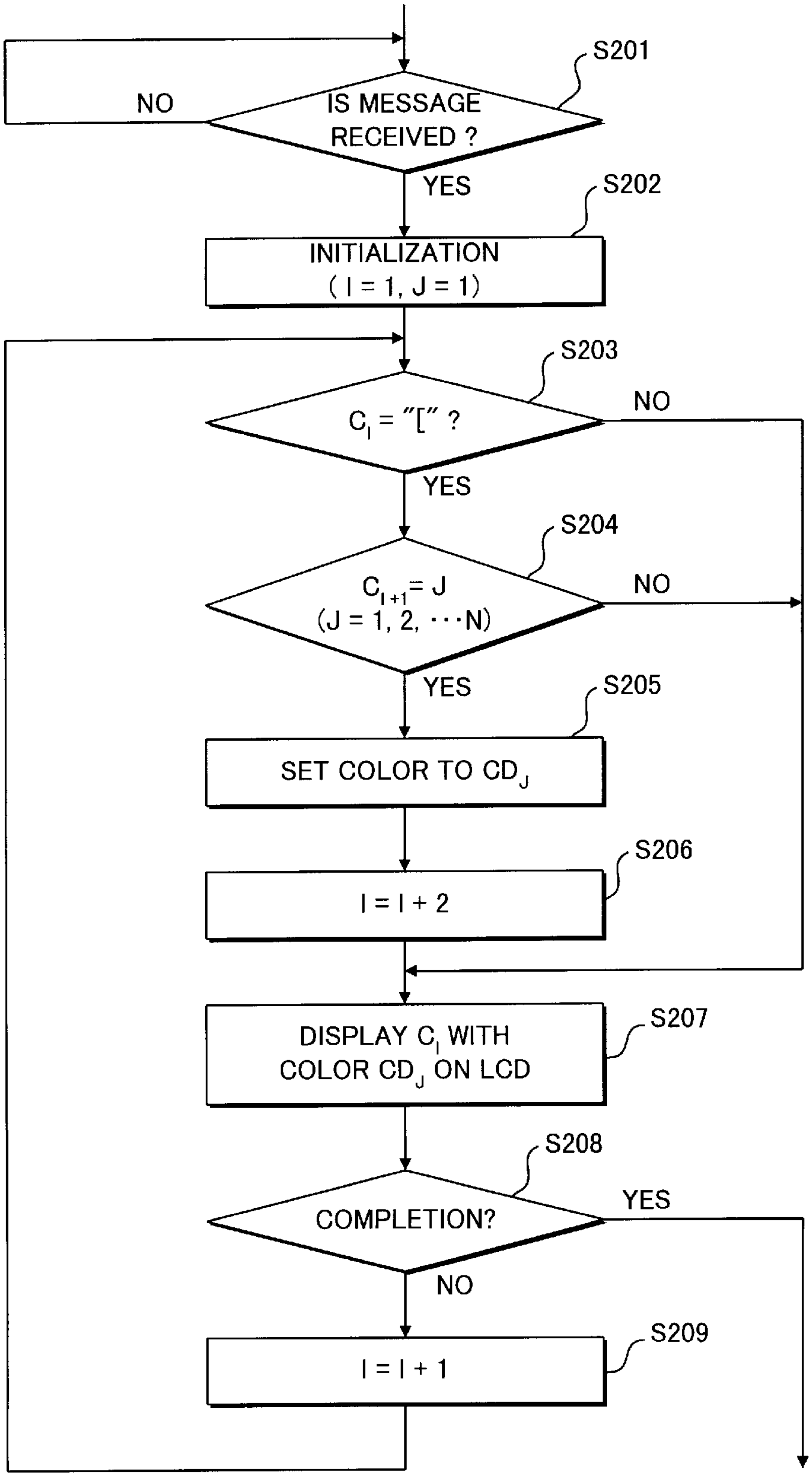
FIG. 3 is a flowchart showing an embodiment of a receiving method according to the present invention.

Referring to FIG. 3, when the selective calling number included in the received data is identical to the ID number (YES of step S201), the control processor 103 stores the received message onto the message memory 106 and controls the alert driver 110 as described before. At the same time, the control processor 103 initializes variables I and J (step S202) before the message displaying control. The control processor 103 reads characters $C_I$ and $C_{I+1}$ of the received message from the message memory 106 and checks whether the first character $C_I$ is identical to the predetermined specific data piece "[" (step S203). When the first character $C_I$ is identical to the predetermined specific data piece "[" (YES of step S203), the control processor 103 further checks whether the second character $C_{I+1}$ is identical to one of predetermined numeral characters ranging 1 to N by incrementing variable J by one (step S204). If $C_{I+1}$ is identical to J (YES of step S204), the control processor 103 recognizes the two characters $C_I$ and $C_{I+1}$ as color selection data. More specifically, the control processor 103 searches the specific data memory 107 according to the specific data piece "[J" for the corresponding color data $CD_J$. In other words, the displaying color is set to the color indicated by the color data $CD_J$ (step S205). After the variable I is incremented by two (step S206), the character $C_I$ (former $C_{I+2}$) is displayed on screen with the selected color of $CD_J$ (step S207). Since the variable I is incremented by two (step S206), the specific data piece "[J" is not displayed on screen. If the displaying routine of the message characters is not completed (step S208), the variable I is Incremented by one and then the control goes back to the step S203.

When the first character $C_I$ is not identical to the predetermined specific data piece "[" (NO of step S203) or the second character $C_{I+1}$ is not identical to J (NO of step S204), the control processor 103 displays the first character $C_I$ on screen according to the color data $CD_J$ (step S207). Since the variable J is initialized to 1, the message character $C_I$ is displayed in black on screen when no specific data is included in the received message.

Figure 4:
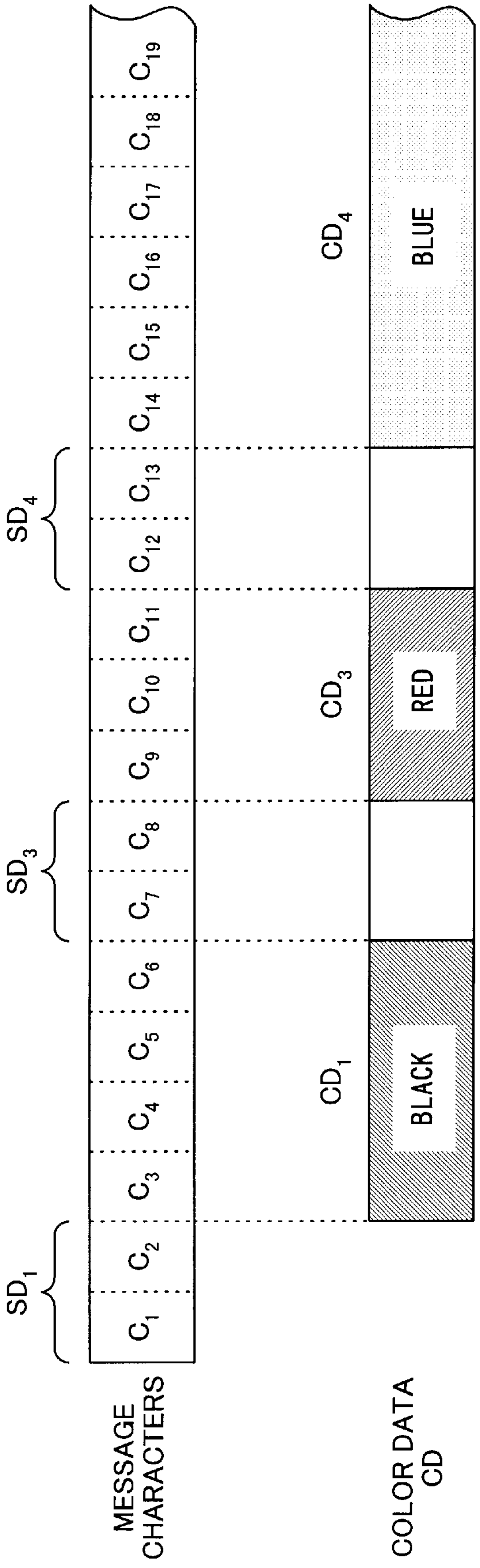
FIG. 4 is a schematic diagram showing an example of color data corresponding to message characters.

As shown in FIG. 4, assuming that the received message consists of characters $C_1$–$C_{19}$, and that three pairs of characters $C_1$ and $C_2$, $C_7$, and $C_8$, and $C_{12}$ and $C_{13}$ are the specific data pieces $SD_1$, $SD_3$ and $SD_4$, respectively. In this case, the message characters $C_3$–$C_6$ are displayed in black, the message characters $C_9$–$C_{11}$ are displayed in red, and the message characters following the character $C_{14}$ are displayed in blue. The processor 103 may search the message memory 106 for the specific characters $C_1$ and $C_2$, $C_7$ and $C_8$, and $C_{12}$ and $C_{13}$ and displays the message characters between them in selected colors, respectively.

Figure 5:
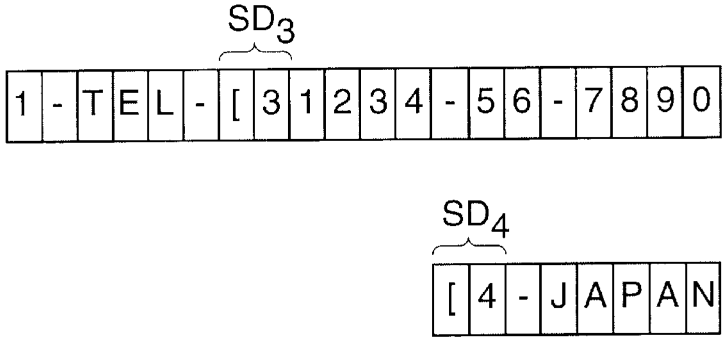
FIG. 5 is a schematic diagram showing a set of received message characters.
Figure 6:
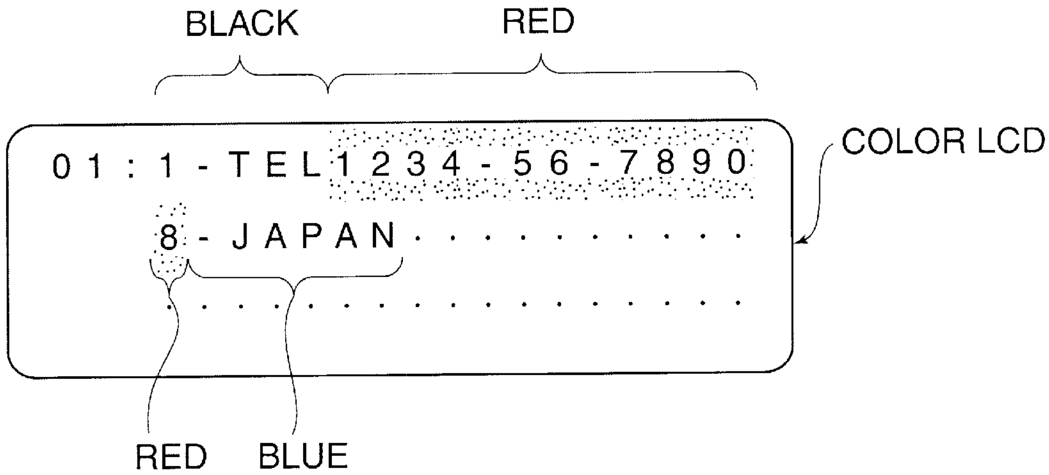
FIG. 6 is a schematic diagram showing the display screen in the case of the received message characters as shown in FIG. 5.

Concretely, as shown in FIG. 5, in the case where a sender user transmits a message "1-TEL-[31234-56-7890[4-JAPAN" to a receiver user, the receiver recognizes the data "[3" and "[4" as specific data pieces $SD_3$ and $SD_4$, respectively Therefore, as shown in FIG. 6, "1-TEL-" is displayed in black, "1234-56-7890" in red, and "-JAPAN" in blue. The other necessary characters are displayed in the initial color, that is, black. In this manner, the information on which the sender user wants to put emphasis is displayed in a specific color on the receiver's display. Therefore, the receiver user can recognize it as important information at a glance.

In the above example, each specific data piece consists of two characters: "[" and a numeral. Such a specific data piece provides a desired number of colors, resulting in improved convenience. Needless to say, the present invention is not restricted to such a specific data piece. A single character may be used as a specific data piece.

What is claimed is:

1. A method for displaying a message on screen in a selective call receiver having a color display device capable of outputting at least a first display color combination and a second display color combination, the method comprising:

a) storing a plurality of predetermined data pieces including a first predetermined data piece and a second predetermined data piece which correspond to said first and second display color combinations colors, respectively;

b) checking whether received message data includes the first predetermined data piece, the received message data comprising a plurality of data pieces;

c) displaying message data following the first predetermined data piece included in the received message data in the first display color combination corresponding to the first predetermined data piece when the first predetermined data piece is detected in the received message data; and d) checking whether the received message includes the second predetermined data piece corresponding to the second display color combination and displaying message data following the second predetermined data piece in the second display color combination when the second predetermined data piece is detected, while simultaneously continuing to display the message data in said first display color combination.

2. The method according to claim 1, wherein the step (b) comprises the step of checking whether each piece of the received message data is identical to one of the plurality of predetermined data pieces.

3. The method according to claim 2, wherein the received message data comprises a plurality of message characters and each of the first and second predetermined data pieces comprises at least one character.

4. The method according to claim 2, wherein the step (c) comprises:

displaying a following piece of the received message data which follows the first predetermined data piece in the first display color combination corresponding to the first predetermined data piece when a piece of the received message data is identical to the first predetermined data piece; and displaying the following piece of the received message data in a display color combination corresponding to a previously selected one of the plurality of predetermined data pieces when the piece of the received message data is not identical to the first predetermined data piece.

5. The method according to claim 2, wherein the step (c) comprises:

setting the first display color combination according to the first predetermined data piece when a piece of the received message data is identical to the first predetermined data piece and displaying a following piece of the received message data which follows the first predetermined data piece in the first display color combination; and displaying the following piece of the received message data in a display color combination corresponding to a previously set one of the plurality of predetermined data pieces when the piece of the received message data is not identical to the first predetermined data piece.

6. The method according to claim 1, wherein, in the step (c), the message data following the first predetermined data piece and preceding a subsequent one of the plurality predetermined data pieces is displayed in said first display color combination corresponding to the first predetermined data piece when the first predetermined data piece and the subsequent predetermined data piece are included in the received message data.

7. A selective call receiver comprising:

a receiver for receiving a message addressed to the selective call receiver, a received message comprising a plurality of characters;

a color display device capable of outputting at least a first display color combination and a second display color combination:

a memory for storing a plurality of predetermined data pieces including a first predetermined data piece and a second predetermined data piece which correspond to said first and second display color combinations, respectively; and a processor for checking whether a received message includes the first predetermined data piece and for displaying a message character following the first predetermined data piece included in the received message in said first display color combination corresponding to the first predetermined data piece on the color display device and for checking whether the received message includes the second predetermined data piece corresponding to the second display color combination and displaying message data following the second predetermined data piece in the second display color combination on the color display device when the second predetermined data piece is detected, while message data in the first display color combination is also displayed.

8. The selective call receiver according to claim 7, wherein the processor checks whether each character of the plurality of received message is identical to one of the predetermined data pieces.

9. The selective call receiver according to claim 8, wherein the processor displays a following character of the received message which follows the first predetermined data piece in the first display color combination corresponding to the first predetermined data piece when a character of the received message is identical to the first predetermined data piece, and wherein the processor displays the following character of the received message in a display color combination corresponding to previously selected one of the plurality of predetermined data pieces when the character of the received message data is not identical to the first predetermined data piece.

10. The selective call receiver according to claim 8, wherein the processor determines the first display color combination according to the first predetermined data piece when a piece of the received message data is identical to the first predetermined data piece and displays a following piece of the received message data which follows the first predetermined data piece in the first display color combination, and wherein the processor displays the following piece of the received message data in a display color combination corresponding to a previously set one of the plurality of predetermined data pieces when the piece of the received message data is not identical to the first predetermined data piece.

11. The selective call receiver according to claim 7, wherein the processor displays message characters following the first predetermined data piece and preceding a subsequent one of said plurality of predetermined data pieces in said first display color combination corresponding to the first predetermined data piece when the first predetermined data piece and the subsequent predetermined data piece are included in the received message.

12. The selective call receiver according to claim 7, wherein the memory is a rewritable memory.

13. An apparatus for displaying a message on screen in a selective call receiver, comprising:

a color display capable of outputting at least a first display color combination and a second display color combination;

a memory for storing a plurality of predetermined data pieces including at least a first predetermined data piece and a second predetermined data piece which correspond to said first and second display color combinations, respectively; and a controller for checking whether received message data includes at least said first and second predetermined data pieces, the received message data comprising a plurality of data pieces, and for controlling the color display such that message data following the first predetermined data piece is displayed in the first display color combination corresponding to the predetermined data piece when the predetermined data piece is included in the received message data and for controlling the color display such that message data following the second predetermined data piece is displayed in the second color display combination simultaneously with the message data displayed in the first display color combination.

14. The apparatus according to claim 13, wherein the memory is a rewritable memory.

15. An apparatus for displaying a message including a plurality of characters in at least first and second display colors against a background color in a single screen, said apparatus comprising:

a color display operable to output said plurality of characters in said first and second display colors against said background color;

a memory for storing a plurality of predetermined data pieces including at least a first predetermined data piece and a second predetermined data piece which correspond to said first and second display colors respectively; and a controller for checking whether received message data includes at least said first and second predetermined data pieces, the message data comprising a plurality of data pieces, and for controlling the color display such that message data following the first predetermined data piece is displayed in the first display color and for controlling the color display such that message data following the second predetermined data piece is displayed in the second display color simultaneously with the message data displayed in said first display color against said background color.

16. The apparatus of claim 15, wherein said color display is an LCD device.

* * * * *